United States Patent
Fukuma et al.

(10) Patent No.: US 8,877,396 B2
(45) Date of Patent: Nov. 4, 2014

(54) FUEL CELL SYSTEM

(71) Applicant: Honda Motor Co., Ltd., Tokyo (JP)

(72) Inventors: Kazunori Fukuma, Wako (JP); Yohei Hidaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 120 days.

(21) Appl. No.: 13/623,547

(22) Filed: Sep. 20, 2012

(65) Prior Publication Data
US 2013/0078542 A1 Mar. 28, 2013

(30) Foreign Application Priority Data
Sep. 21, 2011 (JP) ................... 2011-206067

(51) Int. Cl.
*H01M 8/04* (2006.01)
*H01M 8/10* (2006.01)

(52) U.S. Cl.
CPC ........ *H01M 8/0432* (2013.01); *H01M 8/04753* (2013.01); *H01M 8/04589* (2013.01); *H01M 8/04335* (2013.01); *Y02E 60/50* (2013.01); *H01M 8/045* (2013.01); *H01M 8/04365* (2013.01); *H01M 2008/1095* (2013.01); *H01M 8/04126* (2013.01); *H01M 8/04507* (2013.01); *H01M 8/0494* (2013.01); *H01M 8/04835* (2013.01)
USPC ........... 429/428; 429/413; 429/430; 429/431; 429/433; 429/443

(58) Field of Classification Search
USPC .......................... 429/428, 430, 431
See application file for complete search history.

(56) References Cited

U.S. PATENT DOCUMENTS

| | | | |
|---|---|---|---|
| 5,780,981 A | 7/1998 | Sonntag et al. | |
| 7,311,984 B2 * | 12/2007 | Ueda et al. | 429/438 |
| 2006/0251938 A1 * | 11/2006 | Kamihara | 429/24 |
| 2009/0011301 A1 * | 1/2009 | Matsumoto et al. | 429/23 |

FOREIGN PATENT DOCUMENTS

| | | |
|---|---|---|
| DE | 19540824 A1 | 5/1997 |
| DE | 10 2006 024 170 A1 | 12/2006 |
| DE | 10 2010 002 163 A1 | 8/2011 |

(Continued)

OTHER PUBLICATIONS

IPDL Machine Translation of the Detailed Description of JP2008282682A (Nov. 2008).*

(Continued)

*Primary Examiner* — Gregg Cantelmo
(74) *Attorney, Agent, or Firm* — Squire Patton Boggs (US) LLP

(57) ABSTRACT

A control device of a fuel cell system sets a required output of a fuel cell stack that is required according to a present power demand and predicts the required output and the current according to the temperature of the fuel cell stack from a predetermined output state map that is preset. The control device sets an operation state quantity according to the predicted current and the temperature of the fuel cell stack from a predetermined operation state quantity map that is preset. The control device includes at least one of a pressure at an air supply port of air that is supplied to the cathode electrode of the fuel cell stack, a utilization rate of the air at the cathode electrode, a flow rate of a cooling medium that cools the fuel cell stack, and humidity of the air at the air supply port as the operation state quantity.

8 Claims, 3 Drawing Sheets

(56) References Cited

FOREIGN PATENT DOCUMENTS

| | | | |
|---|---|---|---|
| EP | 1 207 578 B1 | | 4/2010 |
| JP | 09-055219 A | | 2/1997 |
| JP | 2002-034103 A | | 1/2002 |
| JP | 2002-231295 A | | 8/2002 |
| JP | 2004-265683 A | | 9/2004 |
| JP | 2008282682 A | * | 11/2008 |
| JP | 2009-163940 A | | 7/2009 |
| JP | 2009-283282 A | | 12/2009 |
| JP | 2010-009878 A | | 1/2010 |

OTHER PUBLICATIONS

Japanese Office Action Notice of Reasons for Rejection application No. 2011-206067 dated May 14, 2013.
Japanese Notice of Allowance application No. 2011-206067 dated Jul. 30, 2013.
German Search Report file No. 10-2012 217 035.9 issued Oct. 19, 2012.

* cited by examiner

US 8,877,396 B2

FUEL CELL SYSTEM

CROSS-REFERENCE TO RELATED APPLICATION

Priority is claimed on Japanese Patent Application No. 2011-206067, filed on Sep. 21, 2011, the disclosure of which is hereby incorporated herein by reference in its entirety.

BACKGROUND OF THE INVENTION

1. Field of the Invention

The present invention relates to a fuel cell system.

2. Description of Related Art

In the related art, for example, a fuel cell power generating device is known which performs a protective stop of a fuel cell by detecting insufficient supply of a reactant gas over a wide output power range of the fuel cell through a decrease of an output DC voltage of the fuel cell or regulates a change rate of a load increase of the fuel cell when the output DC voltage of the fuel cell is higher than a predetermined limit voltage value (for example, refer to Japanese Unexamined Patent Application, First Publication No. H9-55219).

Moreover, in the related art, for example, a fuel cell power generation control system is known in which a current-voltage characteristic is stored according to an operation temperature of the fuel cell prepared in advance, deviation between a best operation point of the current-voltage characteristic corresponding to required output and an actual operation point is calculated, and the required output is regulated so that the deviation does not exceed the allowed value (for example, refer to Japanese Unexamined Patent Application, First Publication No. 2004-265683).

SUMMARY OF THE INVENTION

However, according to the fuel cell power generating device and the fuel cell power generation control system in the related art, the output may be abruptly decreased according to the regulation of the output of the fuel cell, and there is a concern that a driver or the like in a vehicle on which the fuel cell is mounted as a power source may feel uncomfortable due to the output variation.

In addition, if the output is frequently regulated according to the operating state of the fuel cell, output response of the fuel cell is slow, and for example, there is a concern that driveability of the vehicle on which the fuel cell is mounted as a power source may deteriorate.

Moreover, for example, when the fuel cell characteristics change according to the decrease of the output of the fuel cell, the fuel cell may not be driven with optimal conditions just by performing the regulation of the output due to tendency of the output current to decrease, and there is a concern that operating efficiency may not be improved.

An aspect of the present invention is made in consideration of the above-described circumstances, and an object thereof is to provide a fuel cell system capable of improving the operating efficiency of a fuel cell while securing the required output of the fuel cell.

An aspect according to the present invention includes the following means for achieving the object related to solving the problems.

(1) According to an aspect of the present invention, there is provided a fuel cell system that is mounted on a moving body including a power unit and includes a fuel cell that supplies electric power to the power unit, including: a temperature detection unit that detects a temperature of the fuel cell and outputs the detected results; an output prediction unit that predicts an output according to the temperature and a current of the fuel cell and outputs the predicted results; an operation state quantity setting unit that sets an operation state quantity according to the temperature and the current of the fuel cell; and a control unit that outputs a command value that indicates operation of the power unit according to a power demand with respect to the power unit; wherein the control unit sets a required fuel cell output what the fuel cell requires according to a present power demand and causes the output prediction unit to predict a current according to the required fuel cell output and the temperature of the detected results that are output from the temperature detection unit, and the control unit causes the operation state quantity setting unit to set an operation state quantity according to the current of the predicted results that are output from the output prediction unit and the temperature of the detected results that are output from the temperature detection unit.

(2) In the aspect of (1), the output prediction unit may store a predetermined output state map that is preset, and the output state map may be a map that shows a relationship between the temperature and current of the fuel cell and an output state.

(3) In the aspect of (1) or (2), the operation state quantity setting unit may store a predetermined operation state quantity map that is preset, and the operation state quantity map may be a map that shows a relationship between the temperature and current of the fuel cell and the operation state quantity, and the operation state quantity may be at least one of a pressure at an air supply port of air that is supplied to a cathode electrode of the fuel cell, a utilization rate of the air at the cathode electrode, a flow rate of a cooling medium that cools the fuel cell, and humidity of the air at the air supply port.

(4) In the aspect of (2), the fuel cell system may further include a deterioration state detection unit that detects a deterioration state of the fuel cell and outputs the detected results, and the output prediction unit may correct the output state map according to the deterioration state of the detected results that are output from the deterioration state detection unit.

(5) In the aspect of (3), the fuel cell system may further include a humidification unit that humidifies the air, and the operation state quantity setting unit may correct the operation state quantity map according to at least one of the temperature of the air at the air supply port, the temperature at the air introduction port of the air that is introduced to the humidification unit, and a humidification amount of the air due to the humidification unit.

(6) In the aspect of (3), the fuel cell system may further include a moisture state detection unit that detects a moisture state of a membrane electrode assembly, which includes anode electrode, cathode electrode, and an electrolyte, of the fuel cell and outputs the detected results, wherein the operation state quantity setting unit may correct the operation state quantity map according to the moisture state of the detected results that are output from the moisture state detection unit.

According to the aspect of (1), since the current corresponding to the required fuel cell output according to the power demand can be predicted in advance and the operation state quantity is set according to the predicted current, the required fuel cell output according to the power demand is secured while the change of the output of the power unit is suppressed, and the fuel cell can be operated with optimal efficiency.

According to the aspect of (2), the current of the fuel cell can be easily predicted in advance using the predetermined output state map.

According to the aspect of (3), at least one of the pressure at the air supply port of the air that is supplied to the cathode electrode of the fuel cell, the utilization rate of the air at the cathode, the flow rate of the cooling medium that cools the fuel cell, and the humidity of the air at the air supply port, each of which is an operation state quantity having a large contribution to the operating efficiency of the fuel cell, can be controlled according to the current and the temperature that are predicted in advance according to the power demand, and the fuel cell can be operated with optimal efficiency.

For example, even when the temperature of the fuel cell is changed according to the load of the fuel cell, the outside air temperature, or the like, the fuel cell can be operated with optimal efficiency according to the temperature and the current that is predicted in advance regardless of the load of the fuel cell or the outside air temperature.

According to the aspect of (4), the fuel cell can always be operated with optimal efficiency regardless of deterioration of the fuel cell.

According to the aspect of (5), the operation state quantity can be appropriately controlled according to at least one of the temperature of the air at the air supply port, the temperature at the air introduction port of the air that is introduced to the humidification unit, and the humidification amount of the air due to the humidification unit, which are parameters greatly contributing to a wet state of the fuel cell.

According to the aspect of (6), the operation state quantity can be appropriately controlled according to the moisture state of the membrane electrode assembly.

DETAILED DESCRIPTION OF THE INVENTION

Hereinafter, a fuel cell system according to an embodiment of the present invention will be described with reference to the accompanying drawings.

Figure 1:
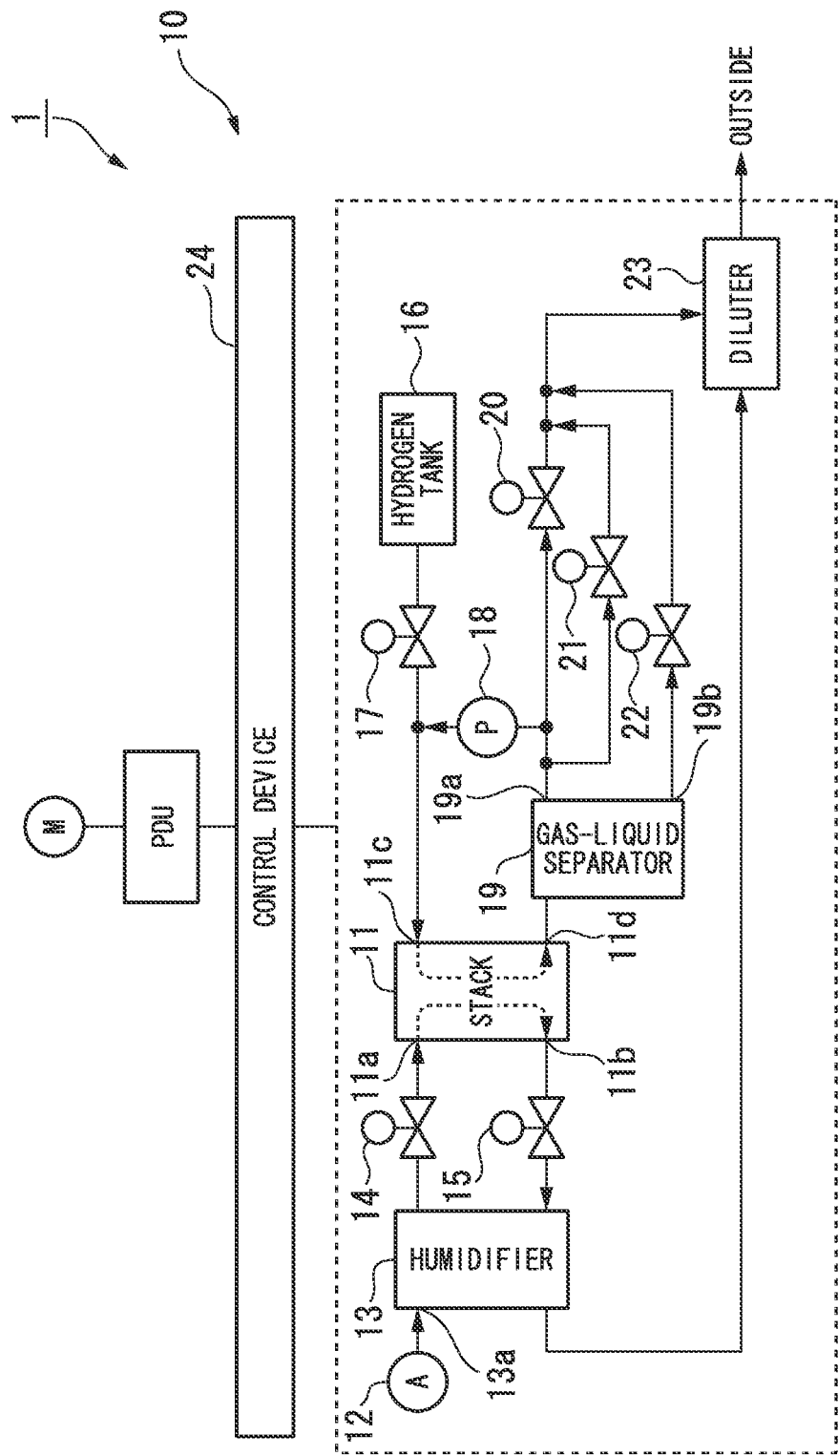
FIG. 1 is a configuration diagram of a fuel cell system according to an embodiment of the present invention.

For example, a fuel cell system 10 according to the present embodiment is mounted on a vehicle (a moving body) 1 which includes a motor M for driving running as a power source, and as shown in FIG. 1, the fuel cell system is configured so as to include a fuel cell stack 11, an air supply device 12, a humidifier (a humidification unit) 13, an air supply sealing valve 14, an air discharge sealing valve 15, a hydrogen supply tank 16, a hydrogen supply valve 17, a circulation pump 18, a gas-liquid separator 19, a purge valve 20, a scavenging outlet valve 21, a drain valve 22, a diluter 23, and a control device (a control unit) 24.

An electrolyte electrode structure body is configured by interposing a solid polymer electrolyte membrane that includes a cation exchange membrane or the like between a fuel electrode (anode) that includes anode catalyst and a gas diffusion layer and an oxygen electrode (cathode) that includes cathode catalyst and a gas diffusion layer, a fuel battery cell is configured by interposing the electrolyte electrode structure body between a pair of separators, and therefore, the fuel cell stack 11 is configured by laminating a plurality of sets of fuel battery cells. In addition, the fuel battery cells laminated body is interposed between a pair of end plates from both sides in the laminated direction.

Air which is oxidant gas (reactant gas) containing oxygen is supplied to the cathode of the fuel cell stack 11, and fuel gas (reactant gas) containing hydrogen is supplied to the anode.

In addition, hydrogen which is ionized on the anode catalyst of the anode by a catalytic reaction moves to the cathode via the solid polymer electrolyte membrane that is appropriately humidified, electrons that are generated due to the movement are extracted to an external circuit, and the extracted electrons are used as direct current electric energy.

At this time, hydrogen ions, the electrons, and oxygen react in the cathode, thereby water is generated, and a discharged gas that passes through the cathode of the fuel cell stack 11 and is discharged from an air discharging port 11b becomes a wet state.

For example, the air supply device 12 includes an air compressor or the like that is driven and controlled by the control device 24, takes in air from the outside and compresses the air, and discharges the compressed air.

The air that is discharged from the air supply device 12 sequentially flows in the humidifier 13 and the air supply sealing valve 14 that is controlled so as to be opened and closed by the control device 24, and thereafter, the air is supplied to the cathode of the fuel cell stack 11.

For example, the humidifier 13 is configured so as to include a water permeable film such as a hollow fiber membrane, uses the gas that is discharged from the air discharging port 11b of the fuel cell stack 11 as a gas for humidification, and humidifies the air that is supplied from the air supply device 12.

That is, the humidifier 13 makes the air that is supplied from the air supply device 12 and the gas that is discharged from the air discharging port 11b of the fuel cell stack 11 contact with each other via the water permeable film, and the water passing through film holes of the water permeable film in water (particularly, water vapor) contained in the discharged gas is added to the air.

Moreover, the gas that passes through the cathode of the fuel cell stack 11 and is discharged from the air discharging port 11b flows in the air discharging sealing valve 15 that is controlled so as to be opened and closed by the control device 24, and thereafter, the gas is supplied to the humidifier 13.

In addition, the discharged gas that is used as the gas for humidification in the humidifier 13 passes through the humidifier 13, and thereafter, the gas is supplied to the diluter 23.

The hydrogen supply tank 16 stores high pressure hydrogen, the gaseous hydrogen that is discharged from the hydrogen supply tank 16 sequentially flows in the hydrogen supply valve 17 that is controlled so as to be opened and closed by the control device 24 and the circulation pump 18, and thereafter, the hydrogen is supplied to a hydrogen supply port 11c and the anode of the fuel cell stack 11.

For example, the hydrogen supply valve 17 is a pneumatic proportional pressure control valve and discharges the hydrogen according to a predetermined range of pressure corresponding to a signal pressure while having the pressure of the air supplied from the air supply device 12 as a signal pressure.

The circulation pump 18 mixes a portion of unreacted gas that passes through the anode of the fuel cell stack 11 and is discharged from a hydrogen discharging port 11d with the hydrogen that is supplied from the hydrogen supply tank 16, and supplies the mixture to the anode of the fuel cell stack 11 again.

The gas-liquid separator 19 separates the water contained in the gas that passes through the anode of the fuel cell stack 11 and is discharged from the hydrogen discharging port 11d, the separated discharged gas is discharged from a gas discharging port 19a, and the separated water is discharged from a water discharging port 19b.

The gas that is discharged from the gas discharging port 19a of the gas-liquid separator 19 is supplied to the circulation pump 18, the purge valve 20 that is controlled so as to be opened and closed by the control device 24, or the scavenging outlet valve 21 that is controlled so as to be opened and closed by the control device 24. Moreover, the discharged gas that passes through the purge valve 20 or the scavenging outlet valve 21 is supplied to the diluter 23.

Moreover, the water that is discharged from the water discharging port 19b of the gas-liquid separator 19 is supplied to the drain valve 22 that is controlled so as to be opened and closed by the control device 24, and the water that passes through the drain valve 22 is supplied to the diluter 23.

The diluter 23 dilutes hydrogen concentration of the discharged gas that is supplied from the purge valve 20 or the scavenging outlet valve 21 by the discharged gas that is supplied from the humidifier 13, and the discharged gas in which the hydrogen concentration after the dilution is decreased so as to be less than or equal to a predetermined concentration is discharged to the outside (for example, the atmosphere or the like) via a backpressure valve or the like that is controlled so as to be opened and closed by the control device 24.

The control device 24 outputs a command value that indicates the operation of each power source according to power demands that are set with respect to outputs of various drive sources to which electric power is supplied from the fuel cell stack 11 such as the motor M for driving running or a fan which is mounted on the vehicle 1.

Figure 2:
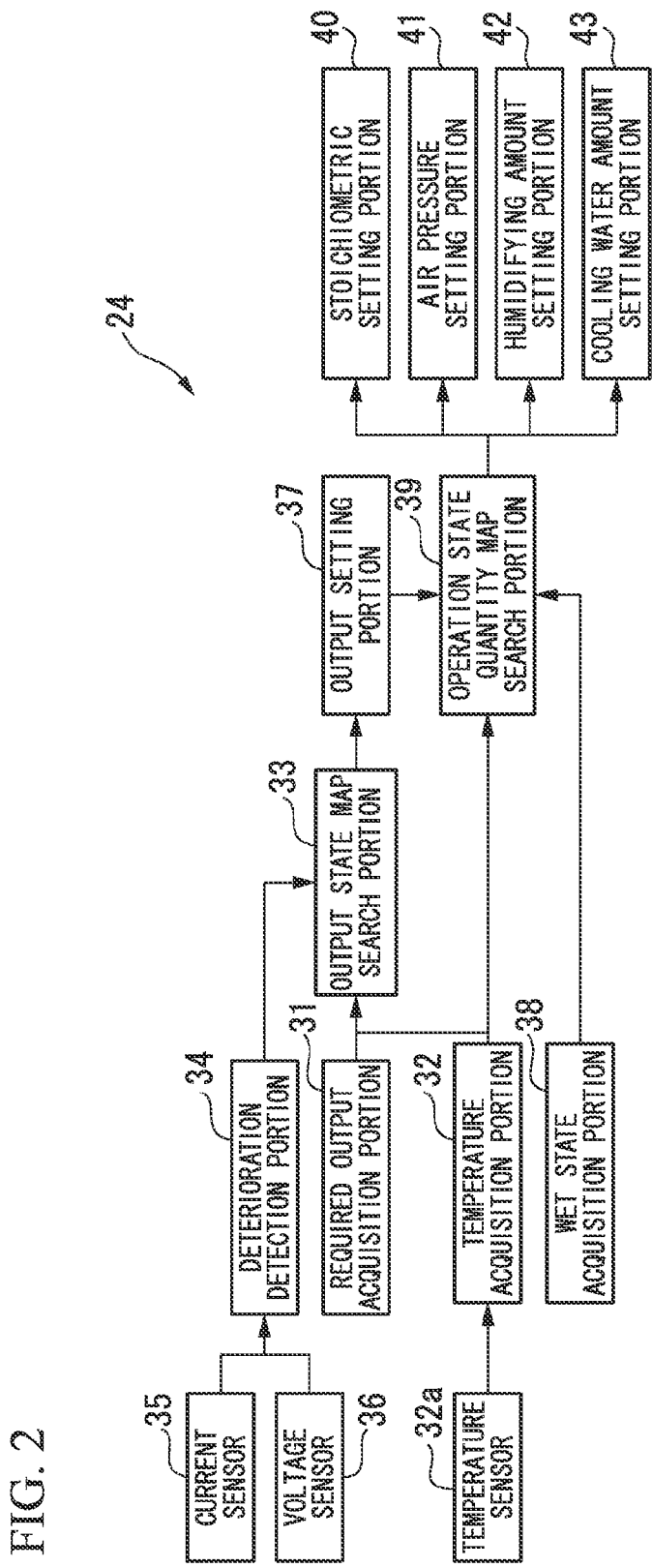
FIG. 2 is a configuration diagram of a control device shown in FIG. 1.

For example, the control device 24 outputs a predetermined command value with respect to a power drive unit (PDU) that controls the motor M for driving running Moreover, for example, as shown in FIG. 2, the control device 24 is configured to include a required output acquisition portion 31, a temperature acquisition portion (a temperature detection unit) 32, an output state map search portion (an output prediction unit) 33, a deterioration detection portion (a deterioration state detection unit) 34, a current sensor 35, a voltage sensor 36, an output setting portion (an output prediction unit) 37, a wet state acquisition portion (a moisture state detection unit) 38, an operation state quantity map search portion (operation state quantity setting unit) 39, a stoichiometric setting portion (operation state quantity setting unit) 40, an air pressure setting portion (operation state quantity setting unit) 41, a humidifying amount setting portion (operation state quantity setting unit) 42, and a cooling water amount setting portion (operation state quantity setting unit) 43.

For example, the required output acquisition portion 31 acquires the power demand that is set with respect to the output of various power sources to which the electric power is supplied from the fuel cell stack 11 such as the motor M for driving running or the fan which is mounted on the vehicle 1. Moreover, the required output acquisition portion sets the output (required output) of the fuel cell stack 11 that is required according to the power demand.

For example, the temperature acquisition portion 32 detects the temperature of the fuel cell stack 11 based on signals or the like of detected results that are output from a temperature sensor 32a that detects the temperature of a cooling medium cooling the fuel cell stack 11 and outputs the signals of the detected results.

The output state map search portion 33 stores a predetermined output state map that is prepared in advance, for example, a map that shows correspondence between the temperature and the current in the fuel cell stack 11 and the output state (for example, a net output or the like that is obtained by subtracting consumed electric power of various auxiliary machines such as an air compressor or a pump from the generated electric power of the fuel cell stack 11).

In addition, the output state map search portion performs a map search according to the required output that is set by the required output acquisition portion 31 and the detected result of the temperature of the fuel cell stack 11 that is output from the temperature acquisition portion 32 with respect to the output state map, searches for the current according to the power demand and the temperature of the fuel cell stack 11, and outputs the signals of the search results.

Figure 3:
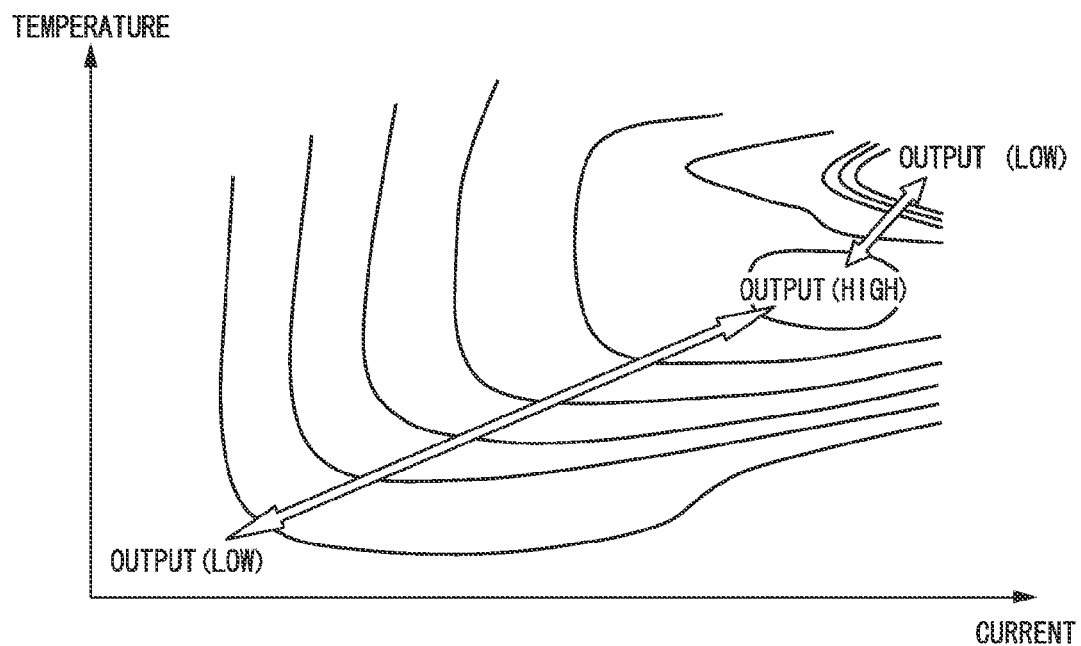
FIG. 3 is a diagram showing an example of an output state map of the fuel cell system.

For example, in the output state map shown in FIG. 3, the output of the fuel cell stack 11 (for example, a designed value of the net output) is changed to be increased to a predetermined upper limit according to an increase of the temperature and the current of the fuel cell stack 11, and the output is changed to be decreased if the temperature and the current are increased from the state of having reached the upper limit value.

In addition, the output state map search portion 33 corrects the stored predetermined output state map based on the signals of the detected results of the deteriorated state of the fuel cell stack 11 that are output from the deterioration detection portion 34.

For example, the output state map search portion 33 changes the generated electric power of the fuel cell stack 11 so as to be decreased to a predetermined value according to an increase of a deterioration degree of the fuel cell stack 11 that is output from the deterioration detection portion 34, and corrects the state map in order to decrease the output (for example, the designed value of a net output) of the fuel cell stack 11 in the predetermined output state map that is stored in advance.

For example, the deterioration detection portion 34 detects a deterioration state of the fuel cell stack 11 (for example, a deterioration degree according to a decrease degree of the output voltage at the same current, or the like) based on signals of the detected results that are output from the current sensor 35 which detects the current of the fuel cell stack 11 and signals of the detected results that are output from the voltage sensor 36 which detects the output voltage of the fuel cell stack 11, and outputs the signals of the detected results.

The output setting portion 37 sets the search results of the current of the fuel cell stack 11 that is output from the output state map search portion 33 as the predicted results of the current.

For example, the wet state acquisition portion 38 detects a humidification amount of air due to the humidifier 13 based on the signals of the detected results that are output from a humidity sensor (not shown) which detects the humidity of the air discharged from the humidifier 13, and outputs the signals of the detected results.

Moreover, for example, the wet state acquisition portion 38 estimates a moisture state of a membrane electrode assembly based on signals of the detected results that are output from a humidity sensor (not shown) which detects the humidity of the gas discharged from the air discharging port 11b of the fuel cell stack 11, the signals of the detected results of the output voltage that is output from the voltage sensor 36 when a predetermined current is applied to the fuel cell stack 11, or the size of the load of the fuel cell stack 11, and outputs the signals of the estimated results.

The operation state quantity map search portion 39 stores a predetermined operation state quantity map that is prepared in advance, for example, a map showing a correspondence between the temperature and current of the fuel cell stack 11 and various operation state quantities (for example, an optimal operation state quantity that is required for maximizing a net operating efficiency considering not only the operation of the fuel cell stack 11 but also the operations of various auxiliary machines such as the air compressor and the pump).

In addition, for example, various operation state quantities include at least one of the pressure at the air supply port 11a of the air that is supplied to the cathode electrode of the fuel cell stack 11, a utilization rate of the air at the cathode electrode, a flow rate of the cooling medium that cools the fuel cell stack 11, and a humidity of the air at the air supply port 11a of the fuel cell stack 11.

Moreover, in the operation state quantity map, the map search according to the predicted results of the current that is output from the output setting portion 37 and the detected results of the temperature of the fuel cell stack 11 that is output from the temperature acquisition portion 32 is performed, various operation state quantities according to the current and the temperature of the fuel cell stack 11 are searched for, and the signals of the search results are output.

Figure 4:
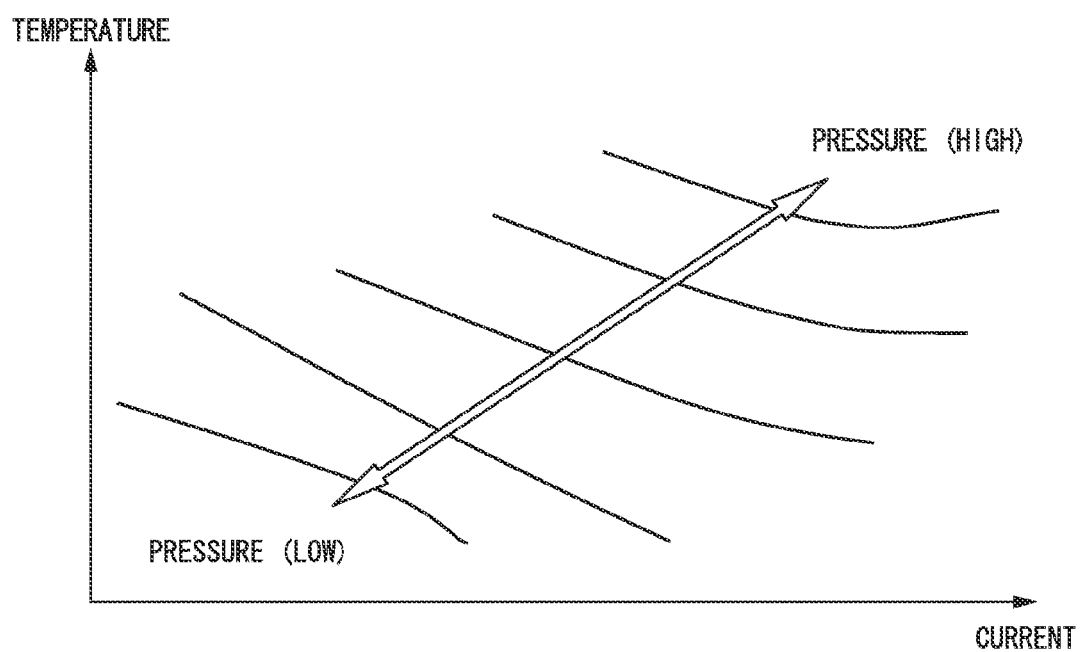
FIG. 4 is a diagram showing an example of an operation state quantity map of the fuel cell system.

For example, in the operation state quantity map shown in FIG. 4, the pressure at the air supply port 11a of the air that is supplied to the cathode electrode of the fuel cell stack 11 is changed so as to be increased according to the increase in the temperature and current of the fuel cell stack 11.

Moreover, for example, the operation quantity map search portion 39 corrects an operation state quantity map according to at least one of the signals of the detected results that are output from a temperature sensor (not shown) which detects the temperature of the air at the air supply port 11a of the fuel cell stack 11, signals of the detected results that are output from a temperature sensor (not shown) which detects the temperature at the air introduction port 13a of the air introduced to the humidifier 13, signals of the detected results of the humidification amount of the air due to the humidifier 13 that is output from the wet state acquisition portion 38, and signals of estimated results of the moisture state of the membrane electrode assembly that is output from the wet state acquisition portion 38.

The stoichiometric setting portion 40 sets the stoichiometry (that is, circulation amount of air) corresponding to a reciprocal number of the utilization rate of the air at the cathode electrode according to the search results of the operation state quantity that is output from the operation state quantity map search portion 39.

The air pressure setting portion 41 sets the pressure at the air supply port 11a of the air that is supplied to the cathode electrode of the fuel cell stack 11 according to the search results of the operation state quantity output from the operation state quantity map search portion 39.

The humidifying amount setting portion 42 sets the humidification amount of the air due to the humidifier 13 or the humidity at the air supply port 11a of the air that is supplied to the cathode electrode of the fuel cell stack 11 according to the search results of the operation state quantity output from the operation state quantity map search portion 39.

The cooling water amount setting portion 43 sets a flow rate of the cooling medium (for example, cooling water) that cools the fuel cell stack 11 according to the search results of the operation state quantity output from the operation state quantity map search portion 39.

As described above, according to the fuel cell system 10 of the present embodiment, since the current corresponding to the output of the fuel cell stack 11 that is required according to the power demand can be predicted in advance and the operation state quantity is set according to the predicted current, the change of the output of the power source is suppressed while the fuel cell stack 11 is protected, the output according to the power demand is secured while a driver of the vehicle 1 feel uncomfortable, and the fuel cell stack 11 can be operated with optimal efficiency.

In addition, since the predetermined output state map according to the temperature and current of the fuel cell stack 11 that are closely related with the output characteristics of the fuel cell stack 11 is used, the current can be easily and appropriately predicted in advance with respect to the output of the fuel cell stack 11 that is increased and decreased according to the power demand.

In addition, at least one of the pressure at the air supply port 11a of the air that is supplied to the cathode electrode of the fuel cell stack 11, the utilization rate of the air at the cathode electrode, the flow rate of the cooling medium that cools the fuel cell stack 11, and the humidity of the air at the air supply port 11a, each of which is an operation state quantity having a great contribution to the operating efficiency of the fuel cell stack 11, can be controlled through the current and the temperature that are predicted in advance according to the power demand, and the fuel cell stack 11 can be operated with optimal efficiency.

For example, even when the temperature of the fuel cell stack 11 is changed as a heat discharge of a radiator of the cooling medium is changed according to the load of the fuel cell stack 11, the outside air temperature, or the like, the fuel cell stack 11 can be operated with optimal efficiency according to the temperature and the current that are predicted in advance regardless of the load of the fuel cell stack 11 or the outside air temperature.

Moreover, since the output state map is corrected according to the deteriorated state of the fuel cell stack 11, the fuel cell stack 11 can always be operated with optimal efficiency regardless of the degradation of the fuel cell stack 11 over time or the like.

In addition, since the operation state quantity map is corrected according to at least one of the temperature of the air at the air supply port 11a, the temperature at the air introduction port 13a of the air that is introduced to the humidifier 13, and the humidification amount of the air due to humidifier 13, which are parameters greatly contributing to the wet state of the fuel cell stack 11, the operation state quantity can be appropriately controlled.

Moreover, since the operation state quantity map is corrected according to the moisture state of the membrane electrode assembly, an appropriate wet state is secured, and the operation state quantity can be appropriately controlled.

As described above, the present embodiment shows an example in which the present invention is embodied, and it is needless to say that the present invention should not be interpreted as limited to the above-described embodiment.

What is claimed is:

1. A fuel cell system that is mounted on a moving body including a power unit and includes a fuel cell that supplies electric power to the power unit, comprising:
   a temperature detection unit that detects a temperature of the fuel cell and outputs the detected results;
   an output prediction unit that predicts an output according to the temperature and a current of the fuel cell and outputs the predicted results;
   an operation state quantity setting unit that sets an operation state quantity according to the temperature and the current of the fuel cell;

a control unit that outputs a command value that indicates operation of the power unit according to a power demand with respect to the power unit; and a deterioration state detection unit that detects a deterioration state of the fuel cell and outputs the detected results, wherein the control unit sets a required fuel cell output what the fuel cell requires according to a present power demand and causes the output prediction unit to predict a current according to the required fuel cell output and the temperature of the detected results that are output from the temperature detection unit, wherein the control unit causes the operation state quantity setting unit to set an operation state quantity according to the current of the predicted results that are output from the output prediction unit and the temperature of the detected results that are output from the temperature detection unit, based on a predetermined operation state quantity map, stored in the operation state quantity setting unit, the predetermined operation state quantity map showing a relationship between the temperature, the predicted current of the fuel cell and the operation state quantity, and wherein the output prediction unit corrects the output state map according to the deterioration state of the detected results that are output from the deterioration state detection unit.

2. The fuel cell system according to claim 1, wherein the output prediction unit stores a predetermined output state map that is preset, and the output state map is a map that shows a relationship between the temperature and current of the fuel cell and an output state.

3. The fuel cell system according to claim 1, wherein the operation state quantity is at least one of a pressure at an air supply port of air that is supplied to a cathode electrode of the fuel cell, a utilization rate of the air at the cathode electrode, a flow rate of a cooling medium that cools the fuel cell, and humidity of the air at the air supply port.

4. The fuel cell system according to claim 3, further comprising:

a humidification unit that humidifies the air, wherein the operation state quantity setting unit corrects the operation state quantity map according to at least one of the temperature of the air at the air supply port, the temperature at the air introduction port of the air that is introduced to the humidification unit, and a humidification amount of the air due to the humidification unit.

5. The fuel cell system according to claim 3, further comprising:

a moisture state detection unit that detects a moisture state of a membrane electrode assembly, which includes anode electrode, cathode electrode, and an electrolyte, of the fuel cell and outputs the detected results, wherein the operation state quantity setting unit corrects the operation state quantity map according to the moisture state of the detected results that are output from the moisture state detection unit.

6. The fuel cell system according to claim 2, wherein the operation state quantity setting unit stores a predetermined operation state quantity map that is preset, and the operation state quantity map is a map that shows a relationship between the temperature and current of the fuel cell and the operation state quantity, and the operation state quantity is at least one of a pressure at an air supply port of air that is supplied to a cathode electrode of the fuel cell, a utilization rate of the air at the cathode electrode, a flow rate of a cooling medium that cools the fuel cell, and humidity of the air at the air supply port.

7. The fuel cell system according to claim 6, further comprising:

a humidification unit that humidifies the air, wherein the operation state quantity setting unit corrects the operation state quantity map according to at least one of the temperature of the air at the air supply port, the temperature at the air introduction port of the air that is introduced to the humidification unit, and a humidification amount of the air due to the humidification unit.

8. The fuel cell system according to claim 6, further comprising:

a moisture state detection unit that detects a moisture state of a membrane electrode assembly, which includes anode electrode, cathode electrode, and an electrolyte, of the fuel cell and outputs the detected results, wherein the operation state quantity setting unit corrects the operation state quantity map according to the moisture state of the detected results that are output from the moisture state detection unit.

* * * * *